United States Patent
Petzold et al.

(10) Patent No.: US 7,047,247 B1
(45) Date of Patent: May 16, 2006

(54) METHOD FOR ENCODING AND DECODING OBJECTS WITH REFERENCE TO A ROAD NETWORK

(75) Inventors: Bernd Petzold, Wunstorf (DE); Bernd Hessing, Holle (DE); Cornelius Hahlweg, Hildesheim (DE); Gerd Draeger, Braunschweig (DE); Ulrich Kersken, Diekholzen (DE); Peter Kreft, Hannover (DE); Jan Martin, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 409 days.

(21) Appl. No.: 10/070,088

(22) PCT Filed: Sep. 5, 2000

(86) PCT No.: PCT/DE00/03056

§ 371 (c)(1),
(2), (4) Date: May 14, 2002

(87) PCT Pub. No.: WO01/18768

PCT Pub. Date: Mar. 15, 2001

(30) Foreign Application Priority Data

Sep. 7, 1999 (DE) ................................ 199 42 522

(51) Int. Cl.
*G06F 7/00* (2006.01)
*G01C 21/26* (2006.01)
*G01C 21/30* (2006.01)

(52) U.S. Cl. ...................... 707/101; 701/200; 701/208
(58) Field of Classification Search ............. 707/104.1, 707/101
See application file for complete search history.

(56) References Cited

U.S. PATENT DOCUMENTS

| | | | | |
|---|---|---|---|---|
| 5,677,837 A | * | 10/1997 | Reynolds | .................. 455/456.3 |
| 5,774,824 A | * | 6/1998 | Streit et al. | .................. 701/207 |
| 5,870,741 A | * | 2/1999 | Kawabe et al. | .................. 707/5 |
| 6,178,377 B1 | * | 1/2001 | Ishihara et al. | ............. 701/200 |
| 6,249,740 B1 | * | 6/2001 | Ito et al. | ...................... 701/200 |
| 6,393,149 B1 | * | 5/2002 | Friederich et al. | ........... 382/173 |
| 6,404,352 B1 | * | 6/2002 | Ichikawa et al. | ........... 340/988 |
| 6,539,294 B1 | * | 3/2003 | Kageyama | .................... 701/23 |
| 6,597,982 B1 | * | 7/2003 | Schmidt | ....................... 701/117 |
| 6,687,611 B1 | * | 2/2004 | Hessing et al. | ............. 701/208 |
| 6,701,248 B1 | * | 3/2004 | Petzold et al. | .............. 701/202 |

FOREIGN PATENT DOCUMENTS

| | | |
|---|---|---|
| DE | 195 02 360 C | 3/1996 |
| DE | 197 50 786 A | 6/1998 |
| EP | 0 300 205 A | 1/1989 |
| EP | 0 725 505 A | 8/1996 |

* cited by examiner

*Primary Examiner*—Safet Metjahic
*Assistant Examiner*—Thanh-Ha Dang
(74) *Attorney, Agent, or Firm*—Michael J. Striker

(57) ABSTRACT

In methods for encoding and decoding objects with reference to a traffic route network, wherein the encoded information can also be decoded with the aid of databases that differ from a database used in the encoding, the objects are provided with relationships to at least one relational object which is present in databases that are used for the decoding, and the relationships do not primarily result from the traffic route network. A position indication can also be provided with a position type designator, which for instance indicates whether the transmitted position is an exact or navigable position or is the location of a search space.

21 Claims, 3 Drawing Sheets

| OT | POS | POST | SW | N1 |
|---|---|---|---|---|
| M | N53°10'04" | O10°30'02" | 0 | 3 | "City Museum" |
Fig.6
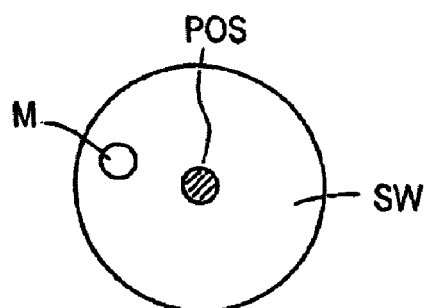
Fig.7
| OT | POS | POST | SW | N1 |
|---|---|---|---|---|
| Z | N53°10'04" | O10°30'12" | 1 | 2 | "Uferstreet" |
Fig.8
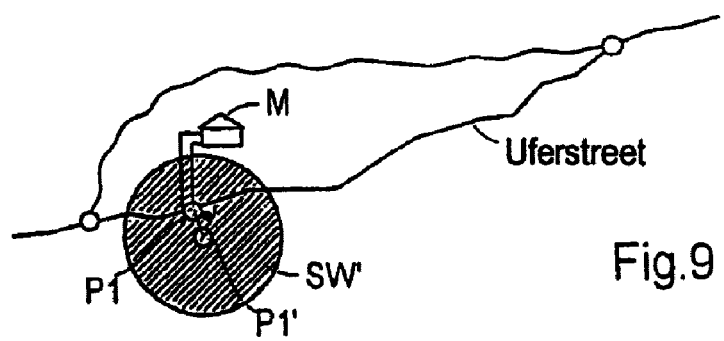
Fig.9

METHOD FOR ENCODING AND DECODING OBJECTS WITH REFERENCE TO A ROAD NETWORK

BACKGROUND OF THE INVENTION

1. Field of the Invention

The invention relates to methods for encoding and decoding objects with reference to a traffic route network, wherein the encoded information can also be decoded with the aid of databases that differ from a database used for the encoding.

2. Description of Related Art

In traffic telematic applications, in which location-specific data are to be exchanged between a transmitter and a receiver, methods for location referencing—also called location encoding—are needed. Methods are employed that describe the location references for the data to be sent in the database of the transmitter, and methods that evaluate the location references of the transmitted data in the receiver. The evaluation involves interpreting the location references and copying them onto the database of the receiver. The description of the location references must be done such that correct copying of the objects by recognizing the location references in the database of the receiver is possible.

Among others for various applications in traffic telematics (such as TMC, GATS), it is known for a description form for location references (also called location encoding) to be standardized. In these applications, as a rule it is a condition that the described locations be present in both the databases of the transmitter and of the receiver and that they have the same location encoding. In the event of deviations, calibration of the databases is required.

Methods for referencing elements from a digital map are also known, which with respect to location encoding have as a prerequisite only similar databases or digital maps with similar digitization. The description of the location references is done on the basis of geographical location coordinates and other descriptive characteristics. For intersections, as elements of the digital map, certain rules are also defined, which determine the location coordinates and characteristics to be transmitted (German Patent Disclosure DE 197 50 786 A1).

The term "objects" is understood in the present connection to mean information with a geographic reference, including multimedia objects such as video sequences, stationary images, or sounds, and/or elements of a digital map.

With the invention, the intent is that it be possible for already existing objects in the receiver database to be addressed, new objects to be placed in the receiver database, and existing objects to be modified.

Against the background of efforts in search of a universal interface between databases of different map publishers, which naturally applies to partial networks to be transmitted as well, the problem arises of copying the given data sets onto one another, or in other words finding unambiguous associations among the corresponding elements.

However, because of publisher-dictated attribution with regard to both the location coordinates and the "heuristic", descriptive characteristics, the result is indefiniteness, which makes unambiguous identification of the encoded object difficult.

In general, the construction of databases is oriented to the type of objectively given linkage of its objects. In the case of digital maps, this is a linkage by way of the neighborhood relationships that exist on the basis of direct street connections.

In mathematical terms, what this means is: Since only the intersection of the attributes used in each of the two databases can be used for comparison purposes, the number of characteristics used for the "pair" identification cannot be greater than the number of attributes that the database, with a low density of characteristics, furnishes per object. The extreme case is then the absence of a corresponding object in the comparison database; in that case, the intersection quantity equals zero.

SUMMARY OF THE INVENTION

The object of the invention is therefore to provide each object in a targeted way with attributes, without having to rely on the relationships defined by the road network and thus on the structure of the comparison database.

In a first version of the invention, this object is attained in that the objects are provided with relationships to at least one relational object which is present in databases that are used for the decoding, and the relationships do not primarily result from the traffic route network.

In the method of the invention, application-independent descriptions of location references can be generated between objects and interpreted. This makes possible the exchange of location-specific objects between a transmitter and a receiver of these objects, independently of how the location references in the particular database are embodied. The databases can be digital maps (for instance in navigation systems) with the same or different detail and geographic coverage.

In a receiver, the encoded object can be detected unambiguously even without evaluation of the relationships to the relational object, and the relational object is detected by means of these relationships and incorporated for instance into the receiver database; the invention does not preclude this.

In many cases, decoding will already be possible when at least one relational object is indicated. However, to achieve greater versatility of databases and objects, in refinements of the invention it is provided that relationships are indicated parallel and/or hierarchically to a plurality of relational objects.

In a first feature of the invention, it can be provided that the relationships are local indications. By way of example, these local indications can be coordinate differences or can comprise distance and direction.

In a second feature of the invention, it is provided that the relationships include logical characteristics, in particular memberships. For instance, a membership exists between the parking lot and the bus or other public transportation stop, in the case of park-and-ride lots.

Preferably in the method of the invention, the information encoded for a respective object (reference object) has the following data structure:

<reference object>
  <reference/relational object 1>
    <reference/relational object 11>
    <reference/relational object 12>
    . . .
  <reference/relational object 2>
  . . .
  <relational object N>, wherein at least the reference object and one relational object are present.

Preferably, in each case an object with the following data structure is encoded: <reference/relational object>:=
  <plane>
  <object type>

<object coordinates>

<object end>.

The term "plane" indicates the hierarchical plane, for instance with reference to the aforementioned data structure, regardless of whether this involves the relational object 1 or 2 on the one hand or the relational object 11 or 12 on the other.

As needed, the data structure of an object can be supplemented with further information, for instance for outputting the object.

In a refinement of the method of the invention, it is provided that data which identify a decoding rule are associated with at least the data of the reference object, and that as needed, data that identify a decoding rule are each associated with the data of the relational objects. Such a need exists for instance if a relational object is to be decoded by a different decoding rule from the reference object.

In the sense of this refinement, examples of the decoding rules can be:

the size of the search window;

the object focus; that is, in addition to the search function, it should also be assured that the coordinate is located inside the outlines of the object, such as a parking lot;

exact position of the information; that is, besides the search function, this information should correspond to an exact position at which, by definition, the plumb line should be dropped onto the object found in the search window, such as the beginning of a traffic jam between two interchanges of an Autobahn (found object).

For the search window, it is also true that its size should depend on the object type and can be specified by the transmitter via the further data field in stages, in order to limit the maximum search radius. For instance, given suitable quantization, with 3 bits it is possible to encode a radius of from 10 m to 10 km.

In a method for decoding, it is provided according to the invention that the at least one relational object is searched for in the database used for the decoding, and thereupon the relationship for the object to be decoded is evaluated. It is preferably provided that search windows are opened around the locations of the relational objects and the reference objects.

In a refinement of the method for decoding, the at least one relational object is searched for in at least one further database, if it is not found in the database intrinsically used for the decoding. It is thus possible to utilize a total of several databases for decoding—such as the database of a TMC receiver and the database (digital road map) of a navigation device.

Since in the encoding of location-specific objects, position indications (location coordinates) almost always form the basis for the data formats, but the function of the coordinates can certainly differ, problems can arise in the decoding in the receiver.

In a second embodiment of the invention, these problems can be solved by providing that the at least one position indication is provided with a position type designator. For instance, it can be provided that the position type designator indicates whether the position indication pertains to an exact position and/or indicates the location of a search space for a position or an object.

In this connection, the term "exact" is understood to mean a position, in contrast to a search space. It is also possible for a position to be exact and at the same time to indicate the location of a search space. This can occur for instance in encoding the beginning of a traffic jam on an Autobahn, where the position, because different coordinate systems are used, is not located on the Autobahn, and the Autobahn is ascertained by a search in the search space around the transmitted position, and then a plumb line is dropped onto the Autobahn in order to find the beginning of the traffic jam.

It can certainly happen, in encoding location-specific objects, that an object will include a plurality of position indications, and it can therefore be provided within the scope of the invention that the position type designator is valid for one position indication at a time, or that the position type designator is valid for a plurality of position indications.

It is also possible with the invention for further information for indicating position be encoded with a refinement, in that the position type designator has at least one attribute, which designates further properties of the position indication. Among other things, it can be provided that the further properties are an error radius of the position indication, and/or that the at least one attribute indicates whether the position indication is absolute or relative.

BRIEF DESCRIPTION OF THE DRAWING

Exemplary embodiments of the invention are shown in the drawing in multiple figures and explained in further detail in the ensuing description. Shown are:

FIG. 6, a first exemplary embodiment of location encoding according to the invention;

FIG. 7, a schematic illustration pertaining to FIG. 6;

FIG. 8, a second exemplary embodiment of location encoding according to the invention; and FIG. 9, a detail of a digital road map with a decoded object.

DETAILED DESCRIPTION OF THE INVENTION

Figure 1:
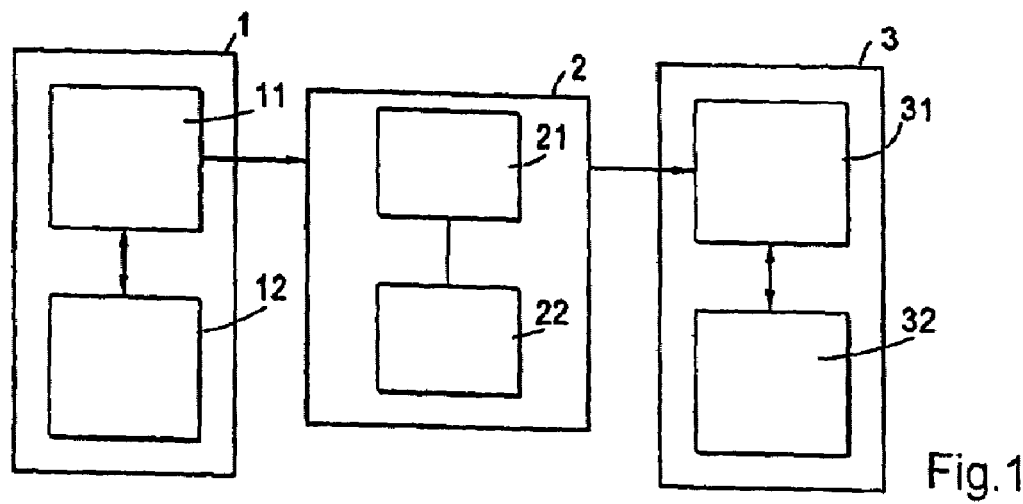
FIG. 1, a block circuit diagram of a device for encoding and decoding according to the invention.

The device shown in FIG. 1 comprises a transmitter 1, a transmission system 2, and a receiver 3. The object 21 to be transmitted is provided in an encoder 11 with location references. Both the object 21 itself and the location references are taken from an object database 12 in the transmitter; by way of example, this is a TMC location database. In the encoder 11, with the aid of the object data from the object database 12, a description 22 of the location references of the object 21 to be transmitted is generated. The encoder 11 transfers the object and the location references to the transmission system 2. In the receiver 3, a decoder 31 accepts the object 21 and the description 22 of the location references. From the description 22 of the location references of the object 21, the decoder compares the objects in its object database 32. If the encoder 31 finds an object in the object database 32 with a description of the location references that is quite similar to or identical to the description 22, then the object 21 in the database 32 is considered to have been referenced.

If, on the basis of the search conditions in the description 22, the decoder 31 finds no reference object with a similar or identical description in the database 32, then the object 21 is considered to be absent from the database 32.

If the description 22 of the location references includes relational objects which—in contrast to the reference objects—were decodable in the database 32, then the object 21, with the aid of the description 22, should be inserted into the database 32. For instance, the description 22 includes the location references indicated for transmission in FIGS. 2–5.

Figure 2:
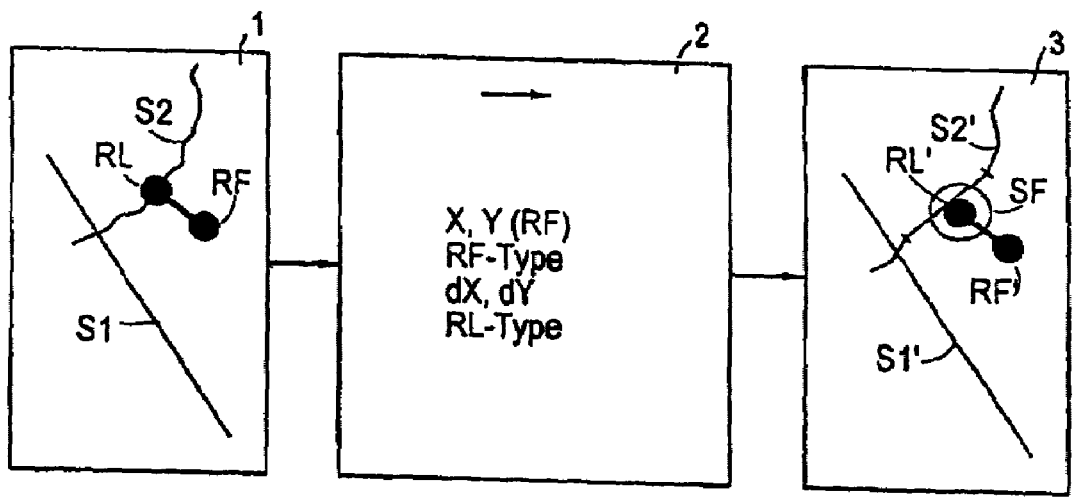
FIG. 2, a schematic illustration of the method according to the invention for pointlike objects.

In the exemplary embodiment of FIG. 2, referencing of pointlike objects is generated using the following elements:

geographic position of the reference object RF in the X and Y coordinates, such as WGS84;

type of reference object;

geographic position of the relational object as an offset (differential coordinate) from the reference object in accordance with a defined calculation rule;

type of relational object.

To avoid ambiguities in dereferencing, the relational object can be selected as an element of the traffic route network, such as a road or street segment or non-digitized entryway, or a further reference object, which itself is referenced by the aforementioned criteria, such as park-and-ride lots that have a parking lot and bus or other public transportation stop.

In FIG. 2, as an example, a detail of a map with the two aforementioned objects RF and RL as well as two streets S1 and S2 is shown in the transmitter.

As an example of the receiver database, once again two streets S1 and S2 are selected, and they are shown in highly generalized form. To ascertain an object, in the database 32 (FIG. 1) of the receiver 3, that corresponds to the reference object, a search window SF is created, which then leads to ascertaining a relational object RL'. Next, via the offset dX, dY, the reference object RF' can be found.

In that case, it was possible to find the relational object RL but not the reference object RF. The object RF is therefore entered as a new object in the database 32. If it had not been possible to find the relational object RL unambiguously, either, then no object could be found and entered.

Figure 3:
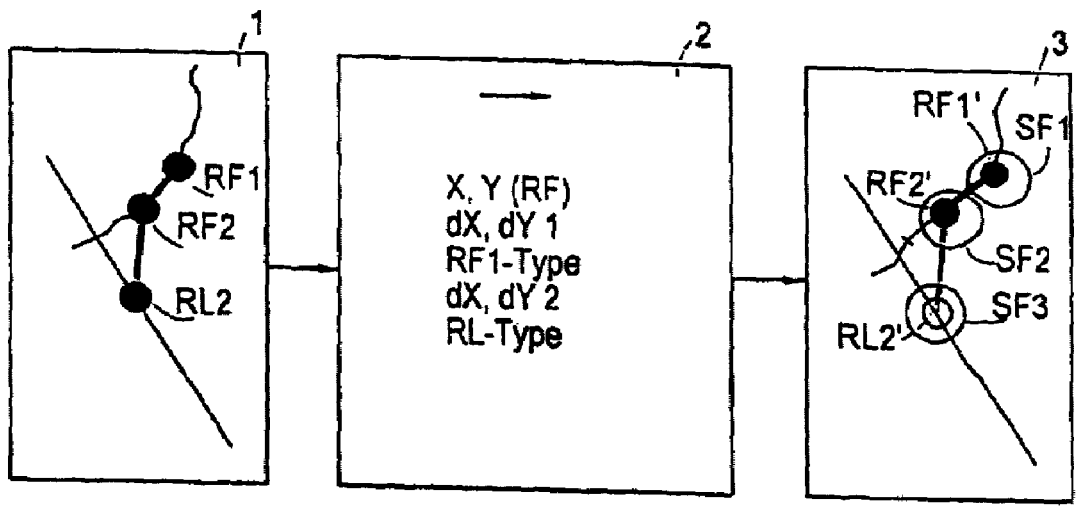
FIG. 3, a schematic illustration of the method according to the invention for linear objects.

FIG. 3 shows an example for referencing a linear object that extends between two pointlike objects RF1 and RF2. These objects are transmitted to the receiver as reference objects, including the references to a relational object RL and the absolute coordinates X, Y of one of the objects. In the receiver, search windows SF1, SF2 and SF3 are formed, so that in the database of the receiver 3, one relational object RL2' and two reference objects RF1' and RF2' are found. By means of RF1' and RF2', it is then also possible to decode the linear reference object.

Figure 4:
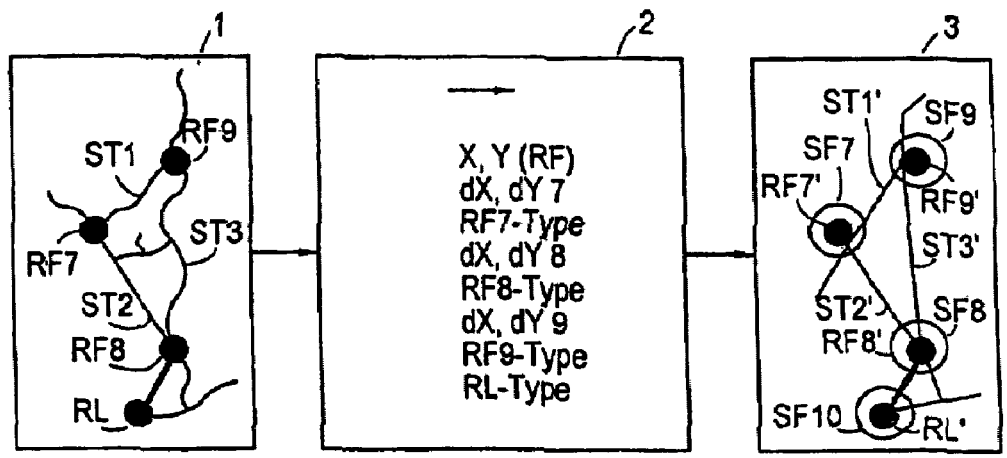
FIG. 4, a schematic illustration of the method according to the invention for two-dimensional objects.

Based on the method for linear objects, two-dimensional objects are encoded via pointlike or linear objects in accordance with FIG. 4, and corresponding differential location coordinates are appended. For each differential location coordinate, a type for the generated or pertinent linear object is additionally indicated. For instance, in accordance with FIG. 4, road segments ST1, ST2, and ST3 are to be encoded, in order to transmit the two-dimensional area enclosed by them. To that end, points of intersection as reference objects RF7, RF8 and RF9 and one relational object RL are selected. The data shown in FIG. 4 are transmitted. In the receiver, search windows SF7–SF10 are created. Inside the search windows, the reference objects RF7'–RF9' and the relational object RL' are then found. The relational object RL' serves as a control, to avoid ambiguities and to enable describing a two-dimensional area as an object, if RF7–RF9 could not be found, while the reference objects RF7'–RF9' serve as points of intersection for the road segments ST1', ST2' and ST3'.

Figure 5:
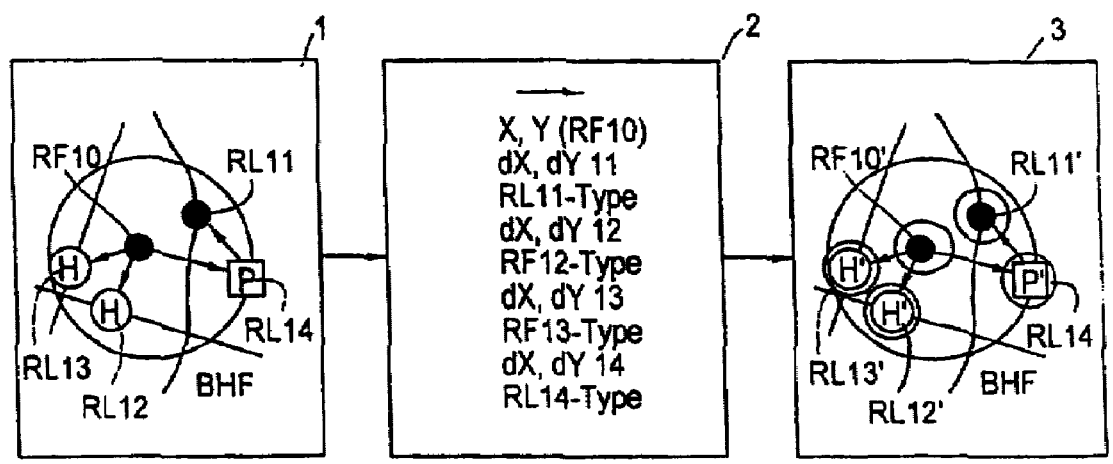
FIG. 5, a schematic illustration of a method according to the invention for complex objects.

As an example of a complex object, which is composed of a plurality of fragmentary objects of arbitrary functional type, FIG. 5 shows a railroad station BHF, which is meant to have a circular two-dimensional extent and is composed of stops H of various transportation lines and a park-and-ride lot P. The stops H and parking lot P serve as relational objects RL12, RL13, RL14, while a reference object RF10 represents the railroad station per se. A further relational object RL11 is subordinate to the relational object RL14. After the data shown at 2 have been transmitted, search windows are again created, in which the corresponding objects RL12', RL13', RL14', RF10', and RL11' are found.

This form of transmitting relational objects can also advantageously be utilized if the transmitter forwards the relational objects H and P, for instance, to the receiver so that the receiver can in turn, as a transmitter, send these relational objects in the form of reference objects to a further receiver for decoding. These relational objects then represent referenceable transitional objects between different object databases (such as the road network and the network of public transportation lines).

FIG. 6 shows one example of location encoding—hereinafter also called location description—whose data fields contain the following information. The data field OT (for Object Type) in this example contains a museum M. The position indication POS includes geographical longitude and latitude values. In the case of the example in FIG. 6, the data field at position type POST contains a 0, which means that these location coordinates are located only in the vicinity of an object, or that the coordinates are not navigable. The width of a search window SW is also indicated, in this example as "3", which means that the object is within an area of $10^3$ m around the location coordinates in the data field POS. Finally, in data field N1, a significant name of the museum is given—in this example "City Museum".

FIG. 7 shows the transmitted position POS, including the search window SW and the encoded location M as it has been found in the search window of the receiver as a result of the search.

A further exemplary embodiment of a location description according to the invention is shown in FIG. 8, in which the object type is an entryway Z to a museum M. Unlike FIG. 6, in the data field position type POST, a 1 is entered, which means that the location coordinates are navigable. A 2 is entered as the width of the search window. As a designation for the POI, the location description in FIG. 8 contains the term "Uferstraße"; that is, the object "entryway" branches off from Uferstraße.

FIG. 9 shows a detail of a digital road map in which a museum M is encoded. A position P1' transmitted in the data field POS forms the center point of a search window SW'. P1 represents the branching point found for an entryway to the museum M and is ascertained by dropping the plumb line from P1' onto the found object "Uferstraße". The museum and the entryway to the museum have a relationship to one another, which can be encoded and decoded, for instance via the reference/relational object data structure described.

The invention claimed is:

1. A method of encoding reference objects with reference to a traffic route network in a transmitter, transmitting the reference objects in encoded form from the transmitter to a receiver via a transmission system and decoding the reference objects in encoded form in the receiver, wherein said transmitter includes an encoder and a database associated with the encoder, said receiver includes a decoder and a database associated with the decoder and the database in the transmitter differs from the database in the receiver, said method comprising the steps of:
  a) encoding a reference object from the database of the transmitter together with relationship information by means of the encoder to generate encoded information, said relationship information comprising location references for the reference object and defining at least one relationship of the reference object to at least one relational object present in the database of the receiver;
  b) transmitting the encoded information from the transmitter to the receiver via the transmission system;
  c) decoding the relationship information including the location references for the reference object in the decoder to ascertain the at least one relationship of the reference object to the at least one relational object already present in the database of the receiver;
  d) searching at least a predetermined portion of the database of the receiver to determine if the reference object is already present in the database of the receiver; and
  e) storing the reference object in the database of the receiver according to the at least one relationship of the reference object to the at least one relational object determined in the decoding of step c) if the searching of step d) establishes that the reference object is not already present in the database of the receiver.

2. The method as defined in claim 1, further comprising setting up a search window that defines the limits of the searching of the database of the receiver for the reference object.

3. The method as defined in claim 1, wherein the relationship information defines respective plural relationships to corresponding plural relational objects in the database of the receiver.

4. The method as defined in claim 1, wherein the relationship information defines hierarchical relationships to plural relational objects.

5. The method as defined in claim 1, wherein said at least one relationship includes at least one logical characteristic.

6. The method as defined in claim 5, wherein said at least one logical characteristic is a membership.

7. The method as defined in claim 1, wherein the relationship information for the reference object has a date structure as follows:
  <reference object>
  <reference/relational object i>,
    <reference/relational object ij>,
wherein i is an integer from 1 to N and j, independently of i, is an integer from 1 to N for each i and at least the reference object and one relationship object are present.

8. The method as defined in claim 7, wherein said
  <reference/relational object i>=
  <plane>
  <Object type>
  <Object coordinates><object end> for every i in said data structure.

9. The method as defined in claim 8, wherein the data structure is supplemented with additional information including information entities for outputting the reference object.

10. The method as defined in claim 1, wherein the relationship information for the reference object includes data identifying a decoding rule associated with the reference information for the reference object.

11. The method as defined in claim 1, further comprising searching for the at least one relational object in the database of the receiver and wherein the decoding of the relationship information including the location references for the reference object occurs after the searching.

12. The method as defined in claim 11, further comprising opening search windows around the reference object and the at least one relational object.

13. The method as defined in claim 11, further comprising providing an additional database associated with the decoder in the receiver and searching the additional database when the at least one relational object is not found in the database in the receiver during the searching of the database in the receiver.

14. The method as defined in claim 1, wherein the relationship information includes at least one position indication of the reference object and said at least one position indication is provided with a position type designator.

15. The method as defined in claim 14, wherein the position type designator indicates whether the at least one position indication pertains to an exact position and/or indicates a location of a search space for a position or an object.

16. The method as defined in claim 14, wherein the position type designator designates a type of only a single associated position indication.

17. The method as defined in claim 14, wherein the position type designator designates a type of a plurality of associated position indications.

18. The method as defined in claim 14, wherein the position type designator has at least one attribute designating further properties of the at least one position indication.

19. The method as defined in claim 18, wherein said further properties include an error radius of the at least one position indication.

20. The method as defined in claim 18, wherein the at least one attribute indicates whether the at least one position indication is absolute or relative.

21. The method as defined in claim 18, wherein the position type designator indicates whether a transmitted position is a navigable position or is a location in search space.

* * * * *